United States Patent [19]
Banton

[11] Patent Number: 5,634,088
[45] Date of Patent: May 27, 1997

[54] METHOD AND APPARATUS FOR ROTATION OF HIGH ADDRESSABILITY BITMAP IMAGES

[75] Inventor: Martin E. Banton, Fairport, N.Y.

[73] Assignee: Xerox Corporation, Stamford, Conn.

[21] Appl. No.: 551,602

[22] Filed: Nov. 1, 1995

[51] Int. Cl.$^6$ .................................................. G06K 15/00
[52] U.S. Cl. ........................................... 395/102; 395/117
[58] Field of Search .................................. 395/102, 109, 395/117, 115, 116, 112, 137, 139, 172; 382/293, 296, 297, 298, 299, 300, 301; 358/451, 459; 345/126, 127

[56] References Cited

U.S. PATENT DOCUMENTS

| 4,467,448 | 8/1984 | Regehr et al. | 395/115 |
| 4,716,544 | 12/1987 | Bartley | 382/296 |
| 4,975,977 | 12/1990 | Kurosa et al. | 382/46 |
| 5,012,434 | 4/1991 | Ziethow et al. | 395/117 |
| 5,124,692 | 6/1992 | Sasson | 340/727 |
| 5,359,706 | 10/1994 | Sterling | 395/137 |
| 5,404,411 | 4/1995 | Banton et al. | 382/54 |

OTHER PUBLICATIONS

Xerox Disclosure Journal; "Fast Small–Angle Bitmap Rotation"; Michael J. Denbur; vol. 17, No. 5 Sep./Oct. 1992 391–392.

Primary Examiner—Arthur G. Evans
Attorney, Agent, or Firm—Duane C. Basch

[57] ABSTRACT

The present invention is a method and apparatus for consistently rotating high addressability bitmap images to be rendered on a printing system. The invention first encodes the high addressability image to produce a regular bitmap array and then rotates the regular array. Next the invention applies a compact dot growth operation to assure that the exposure pulses for any gray pixels are consistently positioned, thereby assuring consistent output-independent of the rotation direction.

16 Claims, 7 Drawing Sheets

METHOD AND APPARATUS FOR ROTATION OF HIGH ADDRESSABILITY BITMAP IMAGES

This invention relates generally to a method and apparatus for the rotation of bitmap images, and more particularly to the orthogonal rotation of high addressability bitmap images.

CROSS REFERENCE

The following related application is hereby incorporated by reference for its teachings:

"MULTIFUNCTIONAL APPARATUS FOR APPEARANCE TUNING AND RESOLUTION RECONSTRUCTION OF DIGITAL IMAGES," by Coonan et al., filed Jun. 26, 1995, application Ser. No. 08/496,654.

BACKGROUND AND SUMMARY OF THE INVENTION

The present invention is a method and apparatus suitable for consistently rotating bitmap images that are represented anamorphically. Using a compact dot growth capability associated with the present invention, it is possible to rotate images rendered as high addressability anamorphic bitmaps to produce consistent output regardless of the rotation direction.

It is well-known that bitmap images can be rotated. However, high addressability bitmaps pose additional problems for well-known image processing operations—in particular rotation. For example, using a printing machine with a capability of storing or buffering scanned data prepared at a resolution of 600×600×2 spots/inch (spi) a corresponding output of 1200×600×1 spi can be generated. While such high resolution is desirable because of the inherent improvement in image quality at the higher anamorphic printing resolution, rotating image data stored at 1200×600×1 spi is burdensome and subject to inconsistencies depending upon the rotation direction—clockwise (CW) or counterclockwise (CCW).

Heretofore, a number of patents and publications have disclosed bitmap rotation schemes, the relevant portions of which may be briefly summarized as follows:

U.S. Pat. No. 5,359,706 to Sterling, issued Oct. 25, 1994 teaches image rotation using block transfers. A digital image is rotated clockwise by (1) dividing it into rectangular contiguous blocks, and (2) rearranging the blocks.

U.S. Pat. No. 5,124,692 to Sasson, issued Jun. 23, 1992, is directed to a method and apparatus for providing rotation of digital image data. The invention provides a framestore architecture that permits direct addressing of digital image data in order to generate rotated image and direct addressing at standard video sampling rates in order to generate rotated image data in real time U.S. Pat. No. 4,975,977 to Kurosu et al., issued Dec. 4, 1990, is directed to a rotation processing method and apparatus therefor.

M. Denber, in "Fast Small-Angle Bitmap Rotation," *Xerox Disclosure Journal* Vol. 17, No. 5, Sep./Oct. 1992 discloses an improved algorithm for bit map rotations through small angles.

In accordance with the present invention, there is provided a printing system for rotating a high addressability binary bitmap received for printing, the bitmap including an anamorphic two-dimensional array of input image signals, where a first resolution along a first dimension exceeds a second resolution along a second dimension, the printing system comprising:

an encoder for encoding the input image signals to produce a bitmap image that is represented by a regular two-dimensional array of multi-bit image signals having a resolution in both dimensions that is equivalent to the second resolution;

a first memory for storing the array of multi-bit image signals at the second resolution;

a rotation circuit for rotating the multi-bit image signals stored in said first memory with respect to the orientation of the input image so as to produce a rotated image at the second resolution;

a second memory for storing the image signals of the rotated image;

a compact dot growth circuit, operating on the multi-bit image signals stored in said second memory, for generating output signals, each output signal generated in response to a gray multi-bit image signal having an exposure pulse positioned in response to the states of the multi-bit signal and adjacent multi-bit image signals; and an output engine for outputting an image representation in response to the the high addressability signals generated by said compact dot growth circuit.

In accordance with another aspect of the present invention, there is provided a method, operating in a printing system for rotating a high addressability binary bitmap received for printing by the system, the bitmap including an anamorphic two-dimensional array of input image signals, where a first resolution along a dimension exceeds a second resolution along a second dimension, the method comprising the steps of:

encoding the input image signals to produce a bitmap image that is represented by a regular two-dimensional array of multi-bit image signals having a resolution in both dimensions that is equivalent to the second resolution;

storing the array of multi-bit image signals in a first memory at the second resolution;

rotating the multi-bit image signals stored in the first memory in an increment of about 90° with respect to the orientation of the input image so as to produce a rotated image at the second resolution;

storing the image signals of the rotated image in a second memory;

in response to the multi-bit image signals stored in the second memory, generating high addressability binary signals, wherein each high addressability signal generated in response to a multi-bit image signal has an exposure pulse positioned in response to the states of the multi-bit signal and adjacent multi-bit image signals; and outputting an image representation in response to the the high addressability signals generated by said compact dot growth circuit.

In accordance with yet another aspect of the present invention, there is provided a method, operating on a programmable computer, for rotating a binary input bitmap image in about 90° increments, said input bitmap image representing binary image signals at an N×M resolution, where N=P×M and where P is an integer that is greater than 1, said method comprising the steps of:

encoding the N×M resolution image bitmap to produce a second, P-bit per pixel image bitmap at an M×M resolution;

rotating the second bitmap;

operating on the M×M rotated bitmap to identify those P-bit per pixel signals representing gray pixels therein and producing a third binary image bitmap, wherein exposure pulses for the third binary image bitmap are selectively repositioned within a pixel exposure period so that the pulses abut a pulse from an adjacent pixel period causing the resultant dot for the adjacent pixel period to enlarge upon development.

One aspect of the invention is based on the observation of problems with rotation of high addressability bitmap images as, for example, in resolution enhanced printing systems. Rotation of images in such systems may lead to disparities when equivalent rotations are accomplished in different directions. For example, a 90° clockwise rotation may result in an output print different from that generated by a 90° counter-clockwise rotation. Such difficulties arise as a result of attempting to simply rotate an image that is represented with one resolution being greater than and an integer multiple of the other (e.g., 1200 spots per inch (spi) in one principal direction and 600 spi in the other). This invention is based on the discovery of a technique that alleviates these problems by enabling rotation of anamorphically represented bitmaps. This technique can be implemented, for example, by circuitry or operations that first encode the image to produce an easily rotatable image and also to accomplish compact dot growth (pixel repositioning) after rotation of an encoded image. A machine implementing the invention may also include a laser-based electronic printing system, wherein the laser beam intensity or exposure level may be modified via pulse width position modulation (PWPM) in response to the signals representing the rotated image. Preferably using morphological-like, template-matching techniques for compact dot growth, the present invention facilitates the identification of specific pixel structures within a rotated image and repositions the structures so as to appear in a consistent fashion when rendered by an IOT.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information (e.g., image data). When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." An n-bit item of data has one of $2^n$ values. A "multi-bit" item of data is an item of data that includes more than one bit.

The term "data" includes data existing in any physical form, and includes data that are transitory or are being stored or transmitted. For example, data could exist as electromagnetic or other transmitted signals or as signals stored in electronic, magnetic, or other form.

An item of data "defines" an image when the item of data includes sufficient information to produce the image. For example, a two-dimensional array can define all or any part of an image, with each item of data in the array providing a value indicating the color of a respective location of the image. A "raster" is a one-dimensional array of image data, reflecting a single line of data across a single dimension (length or width) of the image.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image. A "neighborhood operation" is an image processing operation that uses data relating to one part of an image to obtain data relating to another part of an image.

A segment of an image is adjacent to another segment of the image "along an edge" if the two adjacent segments meet at the edge and do not overlap. Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

The term "compact dot growth" (CDG) refers to the selective repositioning (e.g., left, center or right justified) of an exposure pulse within a pixel exposure period so that the pulse's relationship with a pulse from an adjacent pixel period is controlled. Compact dot growth preferably causes the resultant dot to become more stable (e.g., to grow) upon xerographic development.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

"Circuitry" or a "circuit" is any physical arrangement of matter that can respond to a first signal at one location or time by providing a second signal at another location or time. Circuitry specifically includes logic circuits existing as interconnected components, programmable logic arrays (PLAs) and application specific integrated circuits (ASICs). Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium devices with data storage media that they can access. A "memory cell" is memory circuitry that can store a single unit of data, such as a bit or other n-ary digit or an analog value.

An "image input terminal" (IIT) or "image input device" is a device that can receive an image and provide an item of data defining the image. A "scanner" is an image input device that receives an image by a scanning operation, such as by scanning a document.

An "image output terminal" (IOT) or "image output device" is a device that can receive an item of data defining an image and provide the image as output. A "display" is an image output device that provides the output image in human viewable form. The visible pattern presented by a display is a "displayed image" or simply "image." Printers or printing systems are other examples of image output terminals.

Figure 1:
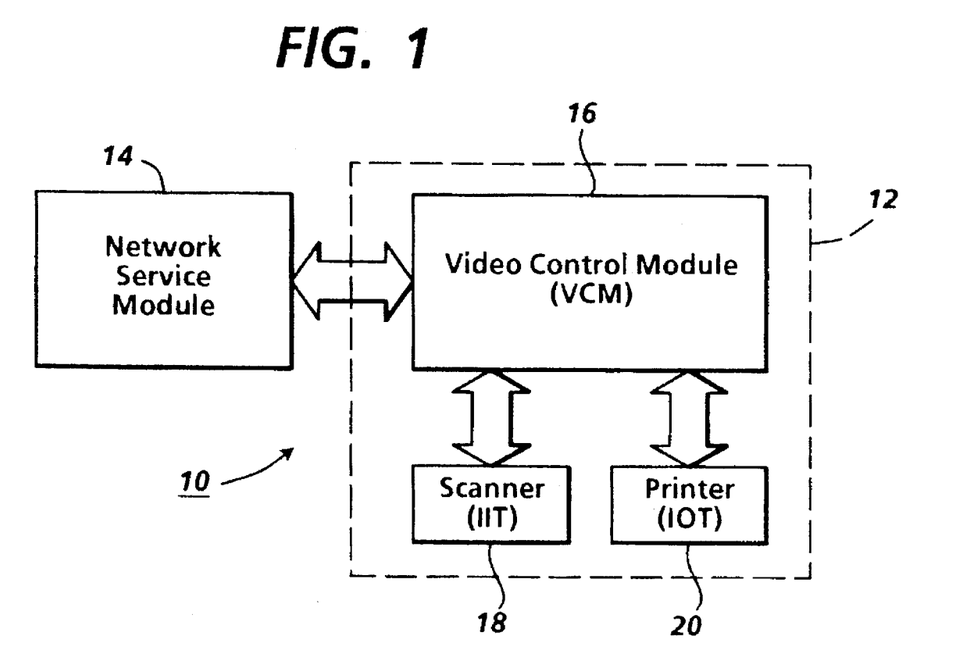
FIG. 1 is a block diagram depicting a multifunctional, network adaptive printing machine.

Referring now to FIG. 1, a multifunctional, network adaptive printing system is designated by reference numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example the VCM 16, which will be described in further detail below, coordinates the operation of the scanner (IIT) and printer (IOT) in a digital copying arrangement. In such an arrangement the scanner 18 "reads" or rasterizes an image on an original document using, for example, a charge coupled device (CCD) array, and converts analog video signals produced by the CCD into digital signals. In turn, an input image processing system 22 (FIG. 2) associated with scanner 18 executes signal correction and the like, converts the corrected signals into multi-level signals (e.g. binary signals), compresses the multilevel signals and preferably stores the same in electronic precollation (EPC) memory 24.

Continuing to refer to FIG. 1, the printer (IOT) 20 preferably includes a xerographic print engine. In one example, the print engine has a multi-pitch photoreceptor belt (not shown) exposed with an imaging source, such as a laser raster output scanning (ROS) device or a light-emitting diode (LED) print bar. In a printing context, the multi-level image data is read out of the EPC memory 24 (FIG. 2) while the imaging source is turned on and off, in accordance with the image signals or data, forming a latent image on the photoreceptor. In turn, the latent image is developed with a development technique and transferred to a print media sheet. Upon fusing the resulting print it may be inverted for duplexing in the printing system or simply output therefrom. It will be appreciated by those skilled in the art that the printer can assume other forms besides a xerographic print engine (e.g., thermal ink jet or ionographic) without altering the concept upon which the disclosed embodiment is based.

Figure 2:
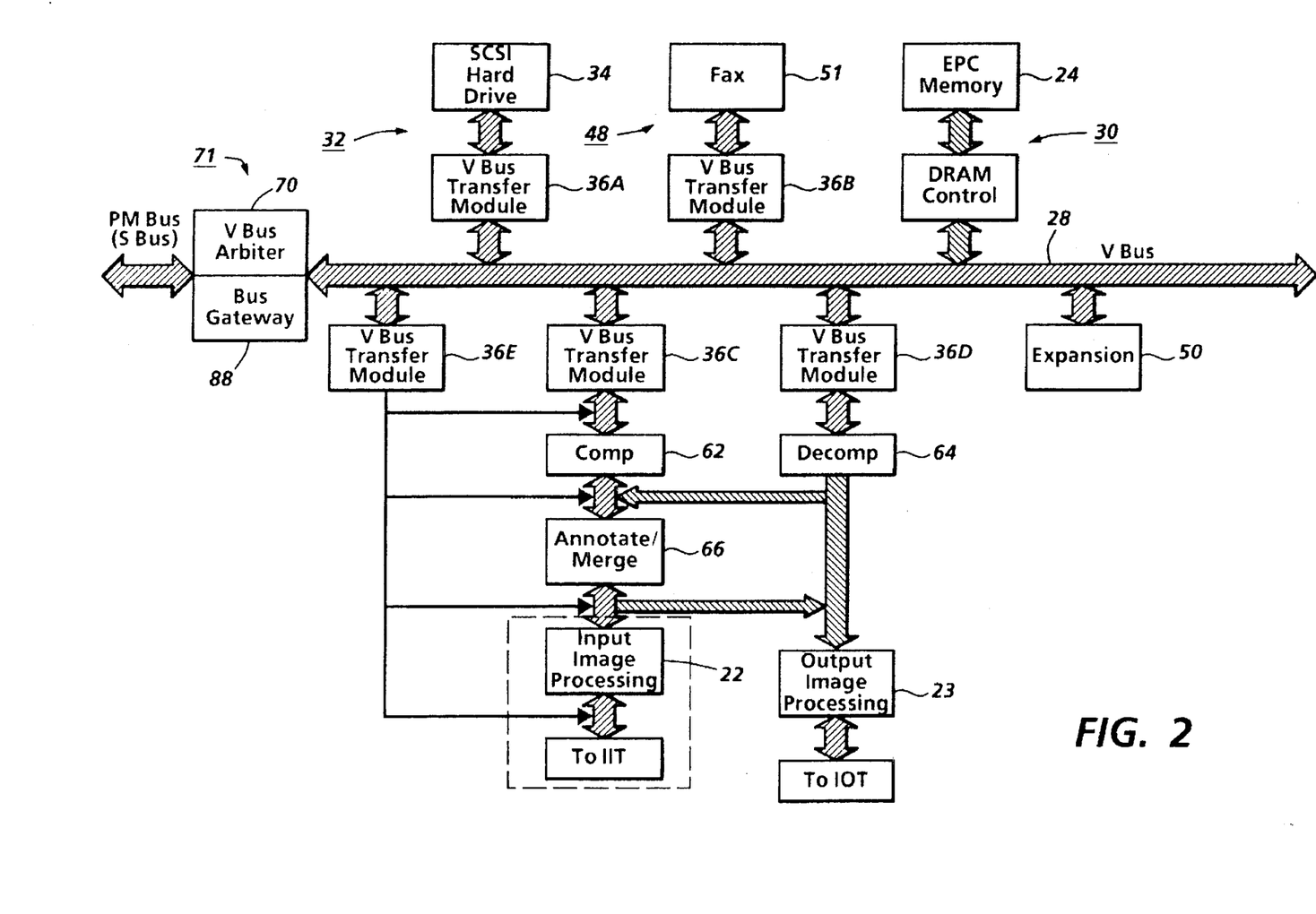
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, VBus 28 is a high speed, 32-bit data burst transfer bus, expandable to 64-bit. The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32-bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way of transfer module 36a through the use of a suitable interface.

Referring to FIGS. 1 and 2, three I/O components are depicted as being coupled operatively to VBus 28, namely a FAX module 48, the scanner or IIT 18, and the printer or IOT 20. It should be recognized, however, that a wide variety of components could be coupled to the VBus by way of an expansion slot 50.

In FIG. 2, the IIT 18 and IOT 20 are operatively coupled to the VBus 28 by transfer modules 36c and 36d. Additionally, the IIT 18 and the IOT 20 are operatively coupled with a compressor 62 and a decompressor 64, respectively. The compressor and decompressor are preferably provided by way of a single module that employs a lossless compression/decompression technique, preferably a Lempel-Ziff compression/decompression device such as those commercially available as application specific integrated circuit devices. Alternatively, a Xerox adaptive compression device may be employed. Xerox adaptive compression devices have been used for compression/decompression operations by Xerox Corporation in its DocuTech® printing system.

The scanner 18, which includes the input image processing section 22, is coupled with an annotate/merge module 66. Preferably the image processing section includes one or more dedicated processors programmed to perform various desired functions, such as image enhancement, thresholding/ screening, rotation, resolution conversion and TRC adjustment. The selective activation of each of these functions can be coordinated by a group of image processing control registers, the registers being programmed by a system controller. Preferably, the functions are arranged along a "pipeline" in which image data is input to one "end" of the pipeline, and processed image data is output from the other "end."

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time.

As illustrated by the embodiment of FIG. 2, input image data from an IIT may be input to image processing section 22. In one mode of operation, the input image data is obtained by scanning or rasterizing a document to produce $2^x$ bits of gray data in the form of a bit stream for each pixel position. In turn, the gray data is thresholded so that an image pixel is expressed as an m-bit image signal where m is less than $2^x$. In one example, the given input image (gray data) is processed at 600×600×2 spi so that m=2 and a resulting output, with a resolution of 1200×600×1 spi (high addressability), can be obtained. As will appear, the present technique is applicable for inputs and outputs of various resolutions, and image data can be obtained from a wide range of input sources without affecting the concept underlying the disclosed embodiment.

It is to be understood that high addressability output devices, IOTs, may be employed to produce "gray" output using subpixel addressing. More specifically, a 2-bit/pixel output image may be produced by output image processing section 23 using a pixel addressing scheme where each pixel is output as a series of two subpixels, where the order and on/off state of the subpixels results in a "gray" output when considered on a pixel-by-pixel basis. However, the higher addressability feature typically results in more image data in order to render the "gray" output. The present invention is directed, in part, to the processing (rotation) of encoded gray data (e.g., 600×600×2) so that consistent rotation of gray input data may be accomplished independent of rotation direction. In a preferred embodiment, the function of the present invention is incorporated in the output image processing section, 23, of FIG. 2. However, it will be further appreciated that it may be possible to combine the functionality of the input and output image processing sections, 22 and 23 respectively, in an alternative embodiment.

Figure 3:
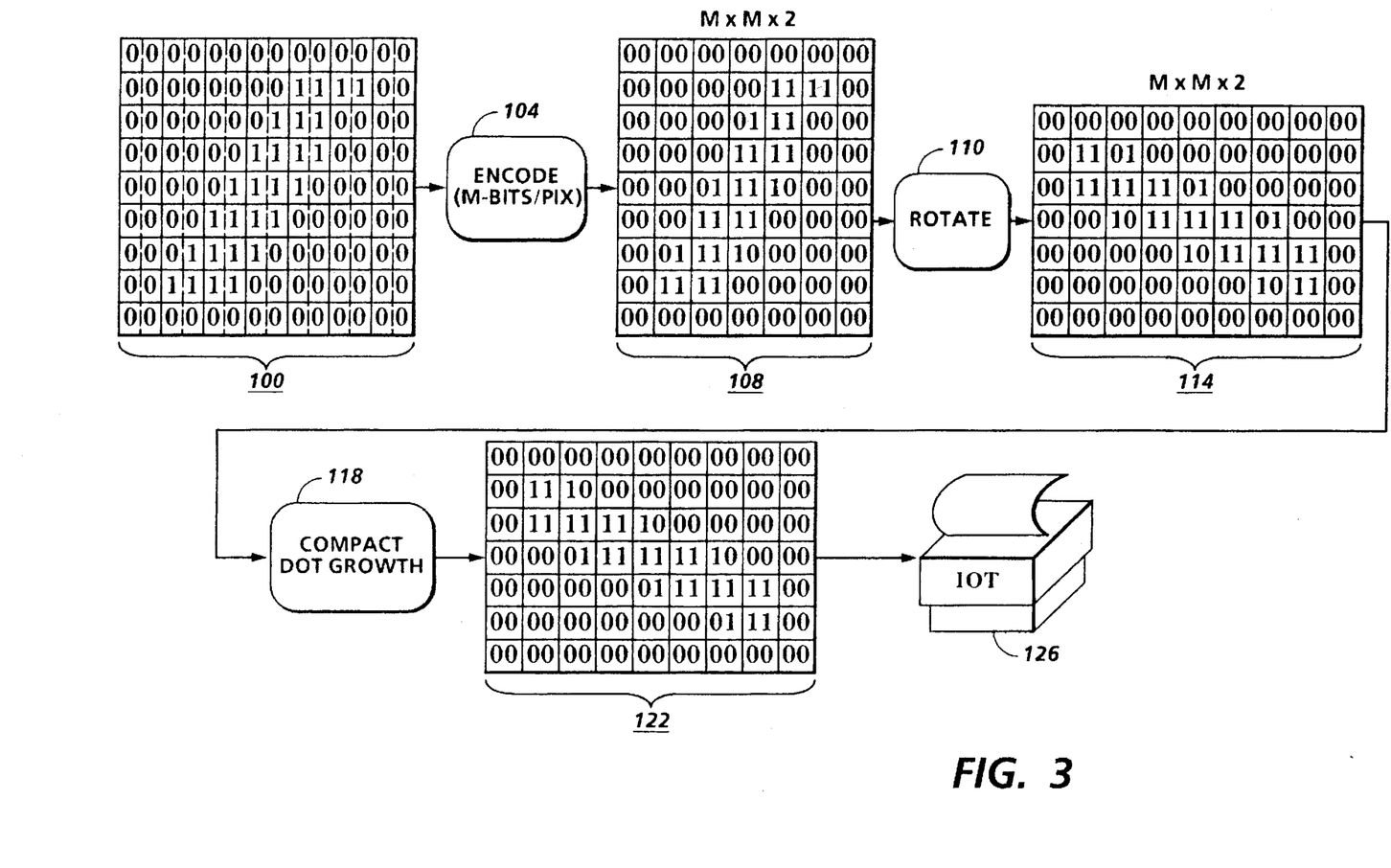
FIG. 3 is a data flow diagram illustrating the various operations and accomplished by the present invention and bitmap image data associated therewith.
Figure 4:
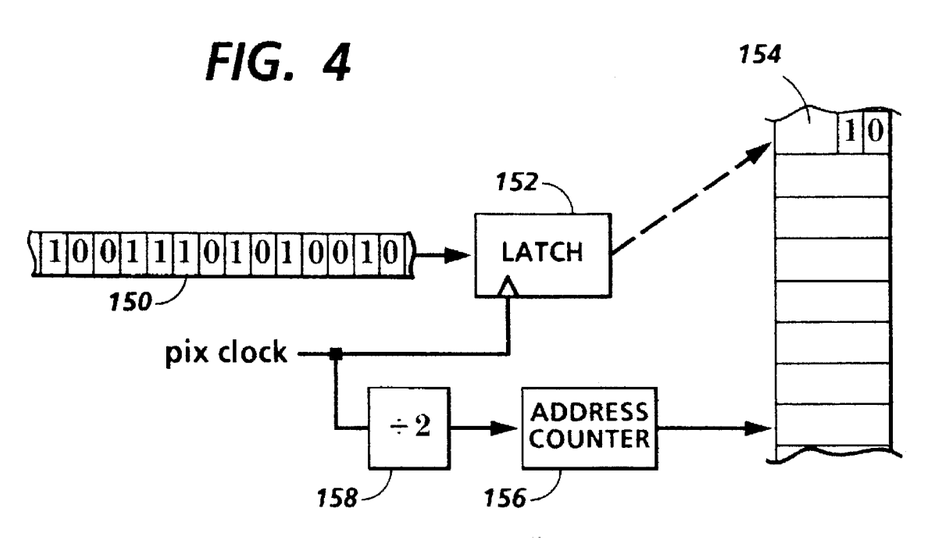
FIG. 4 is a simplified schematic of a digital circuit for encoding a high addressability bitmap in accordance with an element of the present invention.
Figure 7:
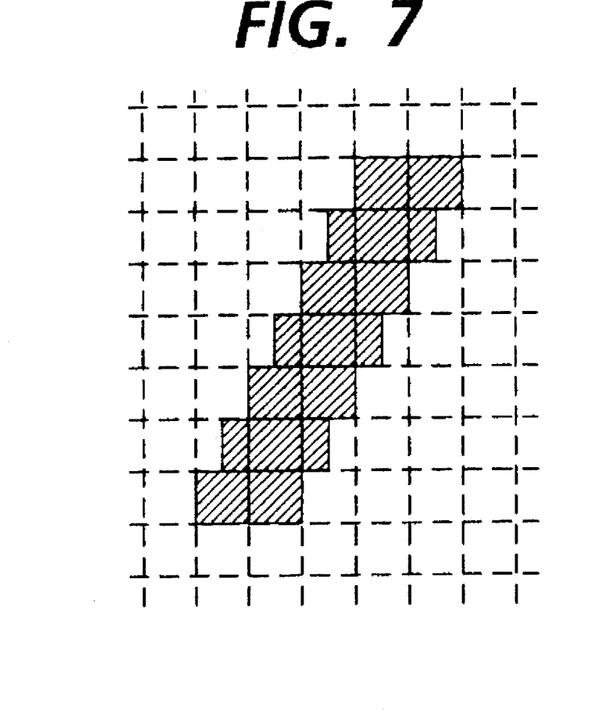
FIGS. 7, 8, 9 and 10 are magnified illustrations of exemplary output images with pixel and raster boundaries superimposed thereon.

Referring now to FIG. 3, there is depicted a data flow diagram illustrating the operations preferably carried out in output image processing circuit 23 of FIG. 2 or, alternatively, in a programmable computer suitable for operating in response to executable code to accomplish the operations described hereafter. In particular, FIG. 3 shows as an input a high addressability N×M bitmap image 100, for example, a 1200×600×1 bitmap where each pixel period is comprised of two binary image signals. A printed rendition of bitmap 100 can be seen in FIG. 7. The input bitmap 100 is transferred to an encoder 104 for encoding the input bitmap signals 100 to produce a second bitmap image 108 that is represented as a regular M×M (e.g. 600×600×2) two-dimensional array of multi-bit (e.g., 2-bit) image signals. The encoded bitmap is generated using bit-wise processing circuitry to decompose the bitstream forming each raster and to sequentially store pairs of bits in the exemplary 2-bit per pixel embodiment described herein. As illustrated specifically in FIG. 4, the bitwise raster 150 is received by the encoder 104 and sequentially shifted through a 2-bit latch 152. After every-other pixel clock (pixclk) for the 2-bit per pixel encoding operation, the 2-bit value is stored in a memory location 154 determined by address counter 156. Address counter 156 is also incremented in response to pixclk, but only after the pixclk signal is divided by two at divider 158. In this manner, an encoded bitmap (2-bits/pixel) is stored in a first memory at the M×M resolution. It will be further appreciated by those skilled in the art of digital design that there are equivalent circuits and operations for accomplishing the afore-described encoding operation.

Referring again to FIG. 3, image 108 having been processed by encoder 104 and stored in memory, is passed to rotation circuitry 110 where the image signals are rotated by a prespecified angle and direction. The rotation operation is preferably done in 90° increments with respect to bitmap images 100 and 108 and may be accomplished using memory transfer routines known to those skilled in digital design. In particular, such transfers may be facilitated using direct memory access operations initiated by a microprocessor and suitable for moving image signals stored in random access memory of a digital computer. The output of rotation circuit 110 is a rotated M×M×2 image 114 that resides in a memory such as the random access memory of the image processing or printing system of FIG. 2.

Generally, once the image signals of the rotated image are stored compact dot growth circuit 118 operates on the rotated multi-bit (e.g., 2-bit) image signals to generate the high addressability binary signals of image bitmap 122 prior to their output to IOT 20. More specifically, the rotated bit stream is preferably stored in EPC memory 24 (FIG. 2). The rotated data is then held in the EPC memory until it is copied to disk 34 or output to an appropriate output device, such as the printer (IOT) 20. As will be appreciated from the discussion above, movement of data between the image processing section, EPC memory and the decompressor, is facilitated by transfer modules 36 of FIG. 2. Each high addressability signal of image 122 is generated in response to the gray multi-bit image signal (e.g., 2-bit/pixel) stored in random access memory and has an exposure pulse positioned within the associated pixel period. The position of the pulse therein is determined using compact dot growth techniques, in response to the states of the multi-bit signal and adjacent multi-bit image signals, processed by output image processing section 23 each time the image is printed.

Figure 5A:
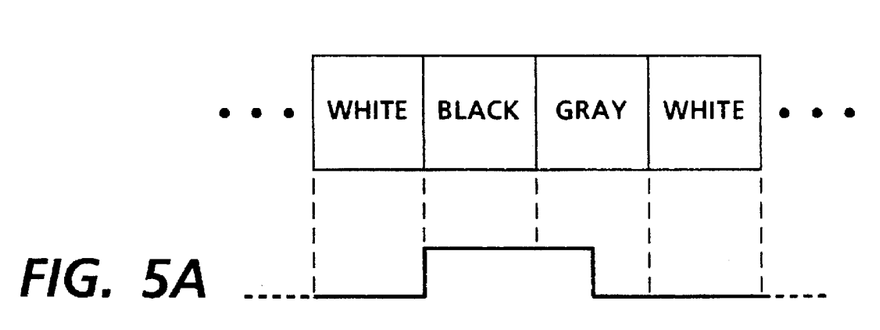
FIGS. 5A, 5B and 5C are illustrations of possible compact dot growth operations as carried out on a stream of image signals and the output signal patterns associated therewith.
Figure 5B:
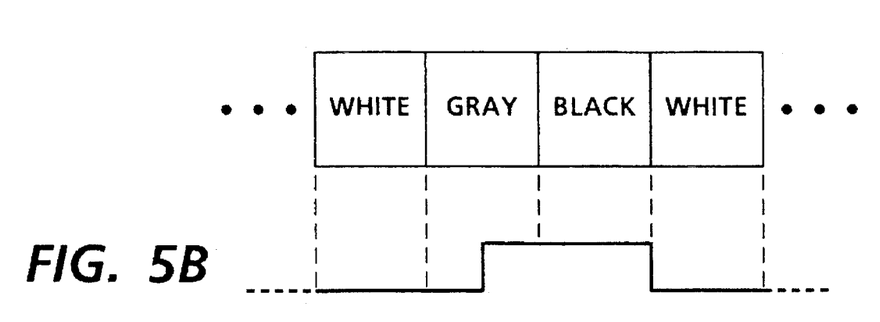
Figure 5C:
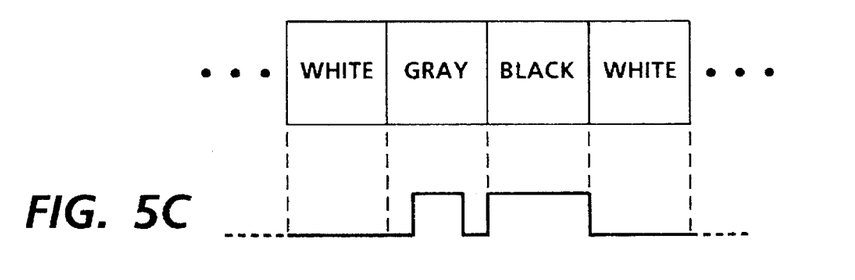

Referring to FIGS. 5A–5C, which generally illustrate the compact dot growth options, whenever a gray pixel (01b or 10b) is located between a white (00b) and a black (11b) pixel the pixel must be processed so as to assure consistent placement in the rotated image upon its output. In particular, FIGS. 5A and 5B illustrate compact dot growth operations wherein the exposure pulses of the gray pixel are shifted to one side or the other of the associated pixel period so as to assure that it serves to enlarge the neighboring black pixel exposure period. In this way, the exposed dot "grows" when subsequently processed by a xerographic or equivalent printing system. Another example of the resulting image is found in FIG. 9. Alternatively, in accordance with another embodiment of the present invention, those gray pixels subject to compact dot growth may be exposed with the exposure pulse centered in the pixel period so as to assure uniform treatment regardless of the direction of rotation of the image. Thus, the gray exposure pulse is centered within the associated pixel period as is depicted by FIG. 5C.

The apparatus used to accomplish the compact dot growth operation described above is depicted as circuit 180 in FIG. 6 and is preferably implemented as an ASIC which may include additional logic functionality therein. Alternatively, the image processing operations described may be performed on a programmable computer, data processor or image processing system. In the preferred embodiment, circuit 80 is located within an ASIC in the VCM 16 of FIG. 1, but may also be placed in-line at any location suitable for processing the rotated image before passing it to the IOT.

Figure 6:
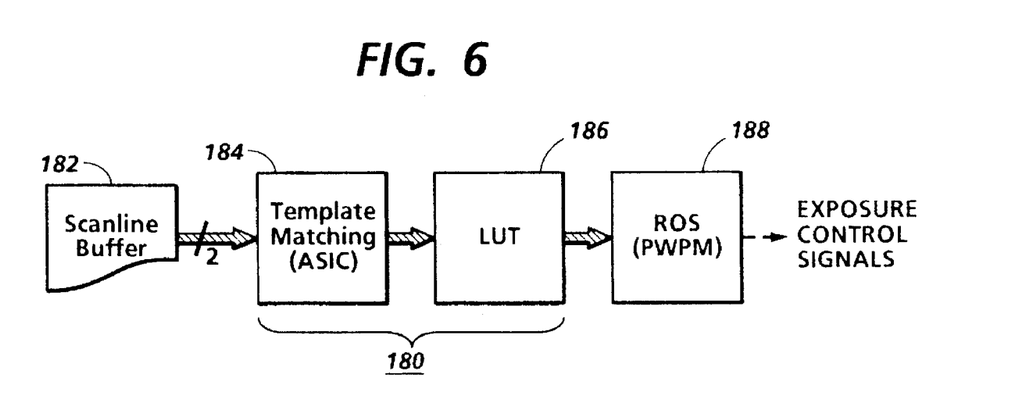
FIG. 6 is a schematic block diagram of the circuit employed in the present invention to accomplish compact dot growth.

Referring to FIG. 6, circuit 180 comprises a pair of functional blocks; template matching circuit or block 184 and look-up table (LUT) 186. Functionally, circuit 180 receives rasterized image signals in a 600×600×2 format from an image buffer 182, which may be any of the previously described memory devices, and processes the image signals so as to produce signals suitable for driving a pulse-width, position-modulated raster output scanner (ROS) 188. The operation of circuit 180, as depicted by blocks 184 and 186 include compact dot growth among other morphological operations.

The purpose of template matching block 184 is to detect an edge transition between a target pixel and any of its adjacent neighboring pixels. For example, as depicted in FIG. 5C, a gray center pixel (01/b or 10/b) located between a black and a white pixel (e.g., along the edge of a line represented in the bitmap image) will likely have its exposure position centered within the pixel period to assure uniformity regardless of rotation direction. In other words, the preferred compact dot growth operation seeks to place the subpixel exposure pulse in the center of the pixel period.

Continuing with FIG. 6 the template matching operations of block 184 are preferably accomplished where the input to the template matching block is a stream of 2-bit image signals representing a target pixel and a plurality of neighboring pixels within a context window surrounding the target pixel. The center or target pixel is the pixel upon which the template matching operations are performed in accordance with the templates therein as described in detail in U.S. patent application Ser. No: 08/496,654, filed Jun. 26, 1995, previously incorporated by reference. Generally, the pattern formed by the image signals for the center and neighboring pixels is compared to each template in a set of predetermined templates in search of a match. If a template in the set is a match, for instance, then a code is generated so as to assure that the exposure pulse is centered. Generally, these templates represent edge transitions and edge transition characteristics that are to be identified within the image. Upon identification of a matching template, the template matching circuit outputs a code associated with the template. The code is then employed to access a location in LUT 186. LUT 186 is preferably comprised of a SRAM having a plurality of contiguous memory locations therein, each memory location suitable for storing an n-bit digital value therein. The n-bit values stored in the LUT describe the width and position of a pixel to be printed (exposed). From the LUT, the n-bit output is delivered to a pulse-width, position-modulated (PWPM) device (not shown) associated with ROS 188 for printing. In one embodiment, the two least significant bits of an 8-bit LUT output define the position of the pixel pulse (left, right or center) within a pixel period. The remaining six bits define the width of the pulse, so that $2^6$ possible widths are available. It will be further appreciated by those skilled in the art that more or fewer bits may be employed (stored in LUT 186 and passed to ROS 188) for the n-bit value output for PWPM control.

Figure 8:
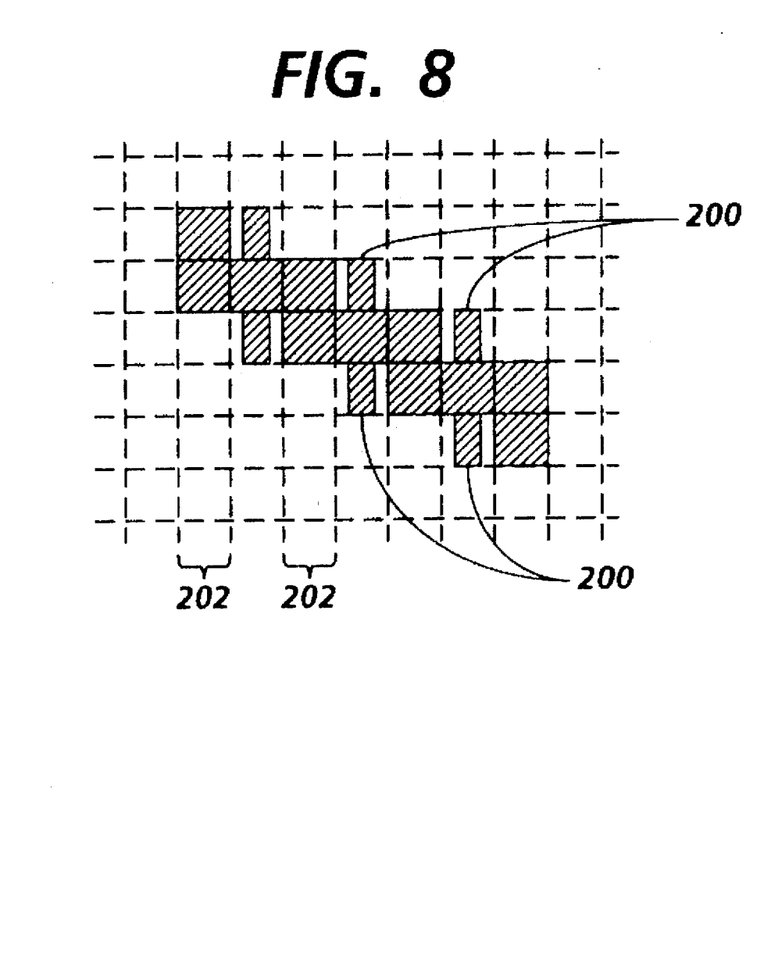
Figure 9:
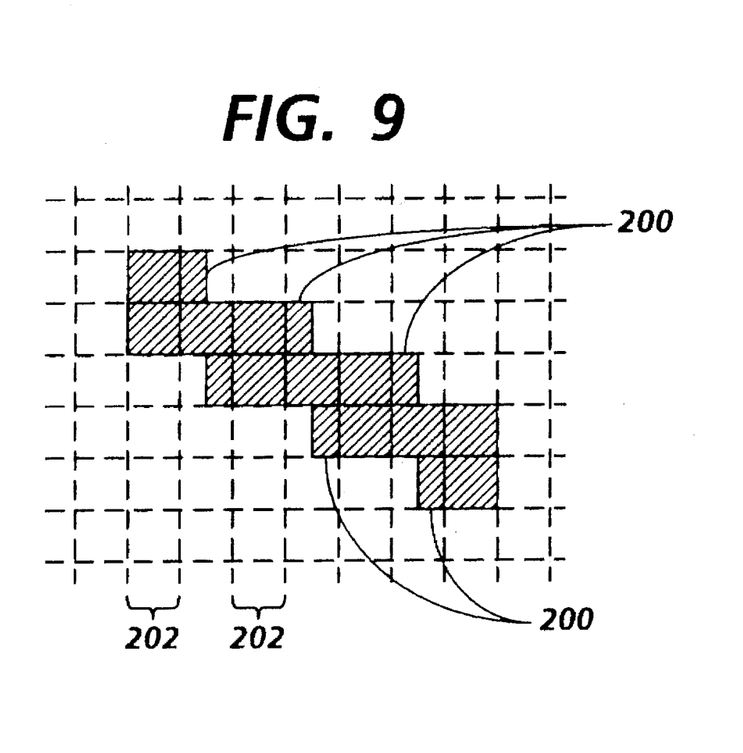
Figure 10:
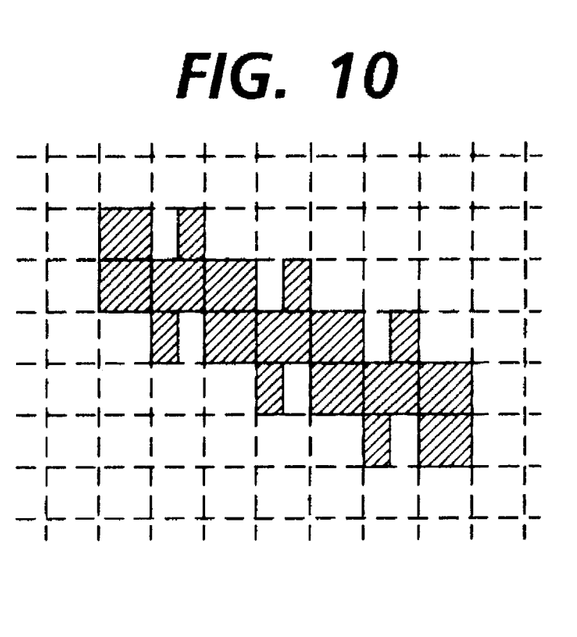

An exemplary enlarged rendition of output image sections for the afore-described invention can be found in FIGS. 8 and 9, where it is shown that the gray pixels 200 of the rotated image are either centered within pixel periods 202 (FIG. 8) or are shifted so as to be adjacent another exposure pulse (FIG. 9). As a contrast, FIG. 10 is provided, showing the result of a 90° CCW rotation when no compact dot growth processing (centering or shifting) is employed.

In recapitulation, the present invention is a method and apparatus for accurately rotating high addressability bitmap images to be rendered on a printing system. The invention first encodes the high addressability image to produce a regular bitmap array and then rotates the regular array. Next the invention applies a compact dot growth operation to assure that the exposure pulses for any gray pixels are appropriately positioned, thereby assuring consistency in the output—independent of the rotation direction.

It is, therefore, apparent that there has been provided, in accordance with the present invention, a method and apparatus for controlling the appearance of a rotated bitmap image so as to control the image characteristics. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A printing system for rotating a high addressability binary bitmap received for printing, the bitmap including an anamorphic two-dimensional array of input image signals, where a first resolution along a first dimension exceeds a second resolution along a second dimension, the printing system comprising:

an encoder for encoding the input image signals to produce a bitmap image that is represented by a regular two-dimensional array of multi-bit image signals having a resolution in both dimensions that is equivalent to the second resolution;

a first memory for storing the array of multi-bit image signals at the second resolution;

a rotation circuit for rotating the multi-bit image signals stored in said first memory with respect to the orientation of the input image so as to produce a rotated image at the second resolution;

a second memory for storing the image signals of the rotated image;

a compact dot growth circuit, operating on the multi-bit image signals stored in said second memory, for generating output signals, each output signal generated in response to a gray multi-bit image signal having an exposure pulse positioned in response to the states of the multi-bit signal and adjacent multi-bit image signals; and     an output engine for outputting an image representation in response to the high addressability signals generated by said compact dot growth circuit.

2. The printing system of claim 1, wherein the output signals are high addressability n-bit signals, comprising:

a 2-bit signal specifying the exposure pulse location; and     an (n–2) bit pulse width signal specifying the exposure pulse duration.

3. The printing system of claim 1, wherein the encoder comprises:

a latch for temporarily storing a plurality of input image signals in response to a clock signal and periodically writing the contents therein to a location in said first memory; and     an address counter, operatively associated with said first memory, for uniquely indicating the address of the location in said first memory in response to the clock signal.

4. The printing system of claim 3, wherein the encoder further comprises a clock signal divider to divide the clock signal by a factor corresponding to the number of bits in the multi-bit image signal.

5. The printing system of claim 1, wherein the compact dot growth circuit comprises:

a template matching circuit for receiving a plurality of neighboring multi-bit image signals from said second memory and comparing the signals against a predefined template pattern to identify a match therebetween, said template matching circuit generating an output code in response to such a match; and a look-up table, responsive to the output code generated by said template matching circuit, for generating the output signals to drive the output engine.

6. The printing system of claim 5, wherein the compact dot growth circuit is incorporated within an application specific integrated circuit.

7. The printing system of claim 5, wherein the compact dot growth circuit is incorporated within a programmable image processing system.

8. The printing system of claim 5, wherein the predefined template pattern represents a region of an image having an edge transition therein.

9. The printing system of claim 1, wherein said rotation circuit rotates the the multi-bit image signals stored in said first memory by multiples of 90°.

10. A method, operating in a printing system for rotating a high addressability binary bitmap received for printing by the system, the bitmap including an anamorphic two-dimensional array of input image signals, where a first resolution along a dimension exceeds a second resolution along a second dimension, the method comprising the steps of:

encoding the input image signals to produce a bitmap image that is represented by a regular two-dimensional array of multi-bit image signals having a resolution in both dimensions that is equivalent to the second resolution;

storing the array of multi-bit image signals in a first memory at the second resolution;

rotating the multi-bit image signals stored in the first memory in an increment of about 90° with respect to the orientation of the input image so as to produce a rotated image at the second resolution;

storing the image signals of the rotated image in a second memory;

in response to the multi-bit image signals stored in the second memory, generating high addressability binary signals, wherein each high addressability signal generated in response to a multi-bit image signal has an exposure pulse positioned in response to the states of the multi-bit signal and adjacent multi-bit image signals; and outputting an image representation in response to the the high addressability signals generated by said compact dot growth circuit.

11. The method of claim 10, wherein the high addressability binary signals are n-bit signals, consisting essentially of:

a 2-bit signal specifying the exposure pulse location; and an (n–2) bit pulse width signal specifying the exposure pulse duration.

12. The method of claim 10, wherein the encoding step comprises the steps of:

temporarily storing, in a latch, a plurality of input image signals in response to a clock signal;

periodically writing the values of at least two signals stored in the latch to a location in the first memory;

dividing the clock signal by a factor corresponding to the number of bits in the multi-bit image signals; and uniquely indicating, with an address counter operatively associated with the first memory, the address of the location in said first memory in response to the divided clock signal.

13. The method of claim 10, wherein the step of generating high addressability binary signals comprises the steps of:

retrieving a plurality of neighboring multi-bit image signals from the second memory and comparing the signals against a predefined template pattern to identify a match therebetween, and generating an output code in response to such a match; and using a look-up table responsive to the output code generated by said template matching circuit, generating the output signals to drive the output engine.

14. A method, operating on a programmable computer, for rotating a binary input bitmap image in about 90° increments, said input bitmap image representing binary image signals at an N×M resolution, where N=P×M and where P is an integer that is greater than 1, said method comprising the steps of:

encoding the N×M resolution image bitmap to produce a second, P-bit per pixel image bitmap at an M×M resolution;

rotating the second bitmap;

operating on the M×M rotated bitmap to identify those P-bit per pixel signals representing gray pixels therein and producing a third binary image bitmap, wherein exposure pulses for the third binary image bitmap are selectively repositioned within a pixel exposure period so that the pulses abut a pulse from an adjacent pixel period causing the resultant dot for the adjacent pixel period to enlarge upon development.

15. The method of claim 14, wherein said encoding step comprises the steps of:

temporarily storing, in a latch, a plurality of input bitmap image signals in response to a clock signal;

periodically writing the values of P-bit signals stored in the latch to a location in a first memory;

dividing the clock signal by P; and uniquely indicating, with an address counter operatively associated with the first memory, the address of the location in said first memory in response to the divided clock signal so as to store the second bitmap image signals in the first memory.

16. The method of claim 15, wherein the step of operating on the M×M rotated bitmap to identify those P-bit per pixel signals representing gray pixels therein and producing a third binary image bitmap, wherein exposure pulses for the third input image bitmap are selectively repositioned within a pixel exposure period comprises the steps of:

retrieving, from the first memory, a plurality of neighboring second image bitmap signals;

comparing the plurality of neighboring second image bitmap signals against a predefined template pattern to identify a match therebetween, and generating an output code in response to such a match; and generating, using a look-up table responsive to the output code generated during said comparing step, the third binary image bitmap.

* * * * *